United States Patent [19]

Fiedler

[11] Patent Number: 4,898,141
[45] Date of Patent: Feb. 6, 1990

[54] FUEL COOLING DEVICE

[75] Inventor: Christian Fiedler, Gernsbach, Fed. Rep. of Germany

[73] Assignee: Aeroquip GmbH, Baden-Baden, Fed. Rep. of Germany

[21] Appl. No.: 221,782

[22] PCT Filed: Sep. 28, 1987

[86] PCT No.: PCT/EP87/00550
§ 371 Date: Apr. 8, 1988
§ 102(e) Date: Apr. 8, 1988

[87] PCT Pub. No.: WO88/02442
PCT Pub. Date: Apr. 7, 1988

[30] Foreign Application Priority Data

Oct. 6, 1986 [DE] Fed. Rep. of Germany ....... 3633951

[51] Int. Cl.4 .................... F02M 31/00; F02M 31/20
[52] U.S. Cl. ....................................... 123/541; 165/51
[58] Field of Search .................. 123/540, 541; 165/51, 165/35, 160

[56] References Cited

U.S. PATENT DOCUMENTS 1,168,136 1/1916 WHite ................................. 165/51
4,036,182 7/1977 Gandy ................................. 123/541
4,582,040 5/1986 Niblett ................................. 165/51

FOREIGN PATENT DOCUMENTS 1551527 9/1988 Fed. Rep. of Germany .
005583 3/1986 Japan .

Primary Examiner—Willis R. Wolfe
Assistant Examiner—Macy M.
Attorney, Agent, or Firm—Max Fogiel

[57] ABSTRACT

A fuel cooling device has a cylindrical housing (1), in which a tube (8) for the refrigerant is mounted. This refrigerant tube 8 is surrounded by a spirally wound fuel tube. The tube (8) for the refrigerant has openings for penetration of the refrigerant into the inner part (2) of the housing (1). The spirally wound fuel tube assembly is constructed as a continuous tube assembly (14), which is also mainly located in the inner part (2) of the housing (1) and is led out of the housing (1) by its connecting ends.

9 Claims, 1 Drawing Sheet

FUEL COOLING DEVICE

BACKGROUND OF THE INVENTION

The invention is a fuel cooling device with a cylindrical housing, in this refrigerant tube a tube for the refrigerant is mounted, which is surrounded by a spirally wound fuel tube. Connecting ends are provided for moving the refrigerant and the fuel.

Fuels for vehicles generally have relatively low boiling point and therefore tend to higher temperatures for evaporation of the volatile matters of the fuel. The additives usually evaporate first, due to both, environmental pollution by uncontrolled exhaust of gas and, deteriorated conditions for the engine due to the lack of additives in the fuel. In order to avoid this as well as vapor lock in the fuel system, there are fuel cooling devices, which are applied in connection with air conditioning devices in the vehicle.

A cooling device of the kind mentioned above is described in the DE-GM 8335036.5. Therein a housing of the shape of a tube section is used, in which a tube for the refrigerant is mounted. On the external face of this tube, there is a spirally formed fuel tube assembly, which is formed in connection with the tube section of the housing. In the cross section of the tube for the refrigerant there is a body to swirl the refrigerant. The housing and the tube for the refrigerant are equipped with respective connecting ends. A cooling device of this kind has the disadvantage that the heat leaving the refrigerant has to be led through a relatively small surface, namely the circumferential surface of the tube for the refrigerant. The contact surface to the refrigerant is therefore limited accordingly. The fuel flows in its spirally wound fuel tube assembly directly along the walls of the housing, which the refrigerant does not reach. This has another disadvantage, since, in the case of an accident, the fuel assembly which is located outside might be damaged. This would cause leakage of the fuel. The cooling performance of a device of this kind might be corrected by the respective equipment and dimensions; however, it cannot be adjusted in operation. In order to reach the sealing of the fuel assembly, a brazing procedure with a minimum of two braze joints is necessary, which requires great efforts.

According to the DE-PS3100021 there, is a fuel cooling device for an internal combustion engine. A refrigerant is axially flowing through the housing, whereas the fuel is led over radial connecting ends and axially directed circular gaps through the housing. The circular gaps are formed by two axial convoluted tubes, which are located on both sides of a connecting tube and are connected to each other on one end by openings of the tube. The refrigerant flows around the outer convoluted tube on its outer surface and around the inner convoluted tube on the inside. Although this kind of construction makes a bigger surface for transmitting the heat available, the use of the convoluted tubes requires a lot of braze joints, the production of which requires great efforts and careful processing. It is advantageous the tube for the fuel is already located inside the housing and is flushed by the refrigerant. Capacity control of the cooling device is missing.

SUMMARY OF THE INVENTION

The invention is based on the task to provide a cooling device of the kind described above, which has a good cooling performance and can be produced simply with only a few braze or welding joints. As a result of the invention, the cooling performance of the device is to be controllable. According to the invention, this is achieved by openings for penetration of the refrigerant into the inner part of the housing and by the spirally wound fuel tube which is constructed as a continuous tube assembly. The fuel tube is also mainly located in the inner part of the housing and is led out of the housing by its connecting ends. The channel to lead the refrigerant is also divided in two parts, namely the inner part of the tube and the inner part of the housing. Both chambers are connected to each other by the openings. One side of the tube is connected to the inlet port for the refrigerant. Therefore, the refrigerant is disturbed by the cooling device over the entire inner part of the housing. In this connection, the fuel tube assembly, constructed as a continuous tube assembly, is also located in the inner part of the housing, causing the entire surface to be overflown by the refrigerant. Therefore, the heat transmission surface is especially big. However, the fuel assembly constructed as a continuous tube assembly does not have any braze joints and therefore has no weak point in the production.

The fuel assembly is protected by being located inside the housing, so that in case of a defect caused by an accident in which the housing is affected, the refrigerant can leak, but the fuel cannot. Production of a cooling device of this kind is comparably simple. The spirally pre-formed fuel assembly is inserted in a cylindrical housing, which is open in the area of one front face. Only the penetrating parts of the fuel assembly in the housing are being brazed or welded. On the other end, the housing is closed by means of a front face or something comparable. The new cooling device has a silencing effect, and therefore, additional silencers in the cooling circulation are not necessary.

One end of the tube for the refrigerant can be located in a front face of the housing, and the other end is connected at the inner part of the housing. The location must not have a sealing effect, because the tube is located in the area of a connecting end for the refrigerant, namely the inlet port, which is connected to the inner part of the housing. The tube is located tightly in this front face, e.g. by means of a press fit. The tube is either open at its other end or it is substantially closed, and therefore the flow of the refrigerant can be affected so 11 that the quantitative distribution is determined of that part of the refrigerant, which penetrates into the inner part of the housing, relative to the quantitative part which flows through the substantially open end and into the inner part of the housing. This also affects the cooling performance of the device.

The inlet connection for the refrigerant is located in one of the front faces of the housing, and the connecting end for the outlet of the refrigerant is located in the other front face. Therefore, the refrigerant flows through the housing from one end to the other in one direction. The spirally wound fuel tube assembly, however, starts and ends in the area of one of the two front faces, and therefore it is advantageous to lead the fuel mainly in counterflow to the refrigerant. An adjustable throttle element can be located in the area of the open end of the tube for the refrigerant. This adjustable throttle element may consist of a throttle valve, a conical valve or something similar and serves the purpose of affecting the quantitative distribution of the refrigerant through the openings as well as the open end.

Therefore, the cooling performance of the device is adjusted for every special case. However, it is also possible to have an expansion element for the control of the throttle element. The expansion element is located adjoining the tube assembly for the fuel. Dependent on the fuel temperature, the expansion element controls the adjustment of the throttle element. If the actual fuel temperature is higher than the temperature desired, which requires increased cooling performance, the expansion element operates the throttle element by closing the open tube end by expansion, in which relatively more refrigerant leaves the openings and reaches the inner part of the housing. However, if the actual fuel temperature falls below the temperature desired, the expansion element will shrink and adjust the throttle element by opening the free end of the tube so that more refrigerant reaches the inner part from the free tube end at a place where it has no cooling effect on the fuel tube assembly.

The tube assembly for the fuel with its two connecting ends can be led through a front face of the housing. A front face of this kind is especially suitable for this and there is the possibility of leading the fuel in counterflow to the refrigerant. It is, of course, also possible to lead the fuel assembly to the outside in the area of the cylindrical housing walls. However, there is less material available, and therefore, the brazing or welding procedure becomes more difficult.

The openings may be distributed over the axial length and the circumference of the tube for the refrigerant. They may be distributed equicircumferentially or in purposeful non-uniformity to affect the temperature of the refrigerant during the axial flow through the inner part of the housing and finally to affect the temperature of the fuel in the tube assembly.

The housing may be constructed in one piece and the front faces are formed from the ending areas of a tube section by cold-forming. In this way one end is reduced to the diameter of the desired connecting tube by cold-forming, a procedure by which a front face is formed.

The front face is equipped with two holes for the fuel tube assembly. After mounting the fuel assembly, the brazing and welding procedures are carried out in the area of one front face. At the other end of the tube section, the other front face and the connecting end for the refrigerant are formed. It is also possible and advantageous for the housing to consist of two extruded halves, each being half the axial length of the housing and therefore connected with each other after mounting of the spirally wound tube assembly. The mounting is carried out by a welding or brazing procedure in which three brazing or welding joints are formed. It is also advantageous to form the two halves of the housing identically, with the exception of the holes for the fuel tube assembly existing on one part.

In the tube assembly for the fuel profile, bodies which have the ability to swirl the flowing fuel may be fixed. Twisted, spoiler bodies or angled plane pieces are especially suitable for this. They can easily be mounted into the tube assembly for the fuel, and their location is fixed by forming the spiral shape.

BRIEF DESCRIPTION OF THE DRAWINGS

The cooling device illustrated in the drawings is explained in the following.

DESCRIPTION OF THE PREFERRED EMBODIMENT

Figure 1:
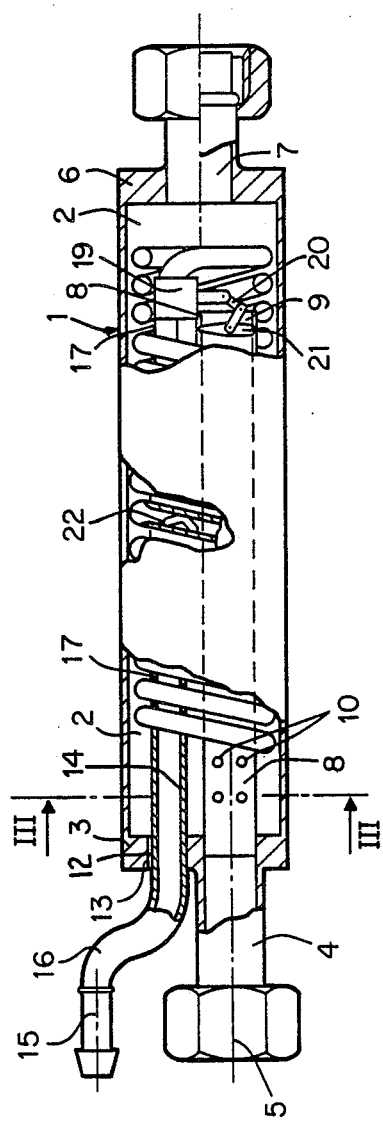
FIG. 1: Partial section of the cooling device
Figure 2:
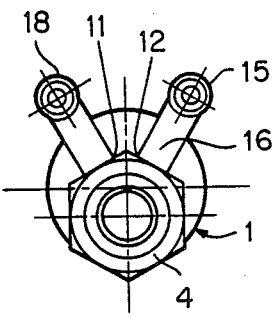
FIG. 2: Front face view of the cooling device
Figure 3:
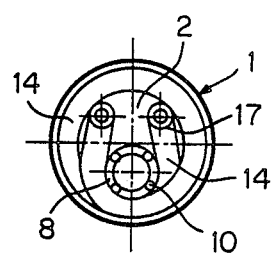
FIG. 3: Section according to the line III—III in FIG. 1.

The cooling device illustrated in drawing 1 has a cylindrical housing (1), which surrounds an inner part (2). On one end of the housing (1) a front face (3) is provided, which extends into a connecting end (4) for the refrigerant or is equipped with such a connecting end (4) of this refrigerant. By this connecting end (4) the refrigerant is filled in as per the arrow (5). On the other end of the housing (1) another front face (6) is formed, which extends into a connecting end (7) (outlet connecting end for the refrigerant). In the front face (3) with connection to the free section of the connecting end (4) there is a tube (8) for the refrigerant, which is equal to the axial length of the housing (1) and extends on its other end (9) opening into the inner part (2) of the housing (1). There are openings (10) in the walls of the tube (8), through which the refrigerant flows out of the tube (8) and into the inner part (2) of the housing. Part of the refrigerant can, also penetrate into the inner part (2) of the housing especially if the end is open.

The fuel assembly is led through two holes (11,12) on the front face (3) of the housing (1) and is fixed by brazing joints (13), thereby sealing it. The fuel assembly consists of a continuous tube assembly (14), which is in one piece. The tube assembly (14) is wound spirally, as shown in the drawing, starting at a connecting end (15) (inlet connecting end) and penetrating into the front face (3) after a bend (16). The tube assembly continues as a straight piece (17), which is nearly as long as the axial length of the housing (1) or the inner part (2) and which is wound spirally afterwards. This leads the fuel in counterflow to the refrigerant. The tube assembly (14) penetrates through the other hole (11) and ends up in a connecting end (18) (outlet connecting end).

Approximately at the transition area between the straight part (17) and the spirally wound part of the tube assembly (14) an expansion element (19) is located, which is connected with a throttle element (21) by means of a link (20). This link is located for example as a throttle valve in the area of the free end (9) of the tube (8). Depending on the expansion of the element (19) due to the fuel temperature, the throttle element (21) is adjusted to assure capacity adjustment of the cooling device. If the temperature of the fuel running into the tube assembly (14) is too high, the expansion element (19) will expand, and the throttle element (21) will lock by closing the free end (9) of the tube (8) and causing comparably more refrigerant to run through the openings (10) into the inner part (2) of the housing (1). However, if the fuel temperature is too low, the expansion element (19) will shrink and adjust the throttle element (21) by opening the free end (9) of the tube causing comparably more refrigerant flows to flow at the end (9) of the tube (8) into the inner part (2). Therefore refrigerant cannot run through the main part of the inner part (2) along the fuel tube assemble. However, it flows directly into the connecting end (7) like 2 short circuit. The cooling effect is thereby decreased and the fuel temperature increases. This is the capacity adjustment.

In order to favor the swirling effect in the tube assembly (14), profile bodies (22) may be fixed as angled or plane pieces. These profile bodies (22) are mounted into the tube assembly (14), before the spiral shape is formed.

Due to the molding procedure of the tube assembly (14), these profile bodies (22) are fixed on the spot. Because of their swirling effect on the fuel, there is better heat transmission.

I claim:

1. A fuel cooling device comprising: a cylindrical housing; a refrigerant tube for carrying a refrigerant mounted in said housing; a spirally wound fuel tube surrounding said refrigerant tube; said refrigerant tube having connecting ends for the refrigerant and for fuel; said refrigerant tube having openings for penetration of refrigerant into the interior of said housing; said spirally wound fuel tube comprising a continuous tube assembly located substantially in the interior of said housing; connecting ends on said tube assembly, said tube assembly exiting from said housing through said connecting ends; and adjustable throttle means located in an open end of said refrigerant tube.

2. A fuel cooling device comprising: a cylindrical housing; a refrigerant tube for carrying a refrigerant mounted in said housing; a spirally wound fuel tube surrounding said refrigerant tube; said refrigerant tube having connecting ends for the refrigerant and for fuel; said refrigerant tube having openings for penetration of refrigerant into the interior of said housing; said spirally wound fuel tube comprising a continuous tube assembly located substantially in the interior of said housing; connecting ends on said tube assembly, said tube assembly exiting from said housing through said connecting ends; and profiled elements in said tube assembly which have a swirling effect on the fuel.

3. A fuel cooling device as defined in claim 1, including expansion means for controlling said throttle means; said expansion element being located in contact with said tube assembly for the fuel.

4. A fuel cooling device as defined in claim 1, wherein said housing has a front face and an inner part, said refrigerant tube having one end lying at said front face of said housing, and said refrigerant tube having the other end connected openly to said inner part of said housing.

5. A fuel cooling device as defined in claim 4, including an inlet port for the refrigerant on said front face of said housing; and an outlet port for said refrigerant located on another front face of said housing.

6. A fuel cooling device as defined in claim 1, wherein said tube assembly with said connecting ends on said tube assembly pass through a front face of said housing.

7. A fuel cooling device as defined in claim 1, wherein said openings for penetration of refrigerant into the interior of said housing are distributed over the axial length and surface of said refrigerant tube.

8. A fuel cooling device as defined in claim 1, wherein said housing is formed as a one piece member, said housing having front faces formed by a terminal part of a tube section by cold forming.

9. A fuel cooling device as defined in claim 1, wherein said housing comprises two extruded halves connected to each other.

* * * * *